Figure 3:
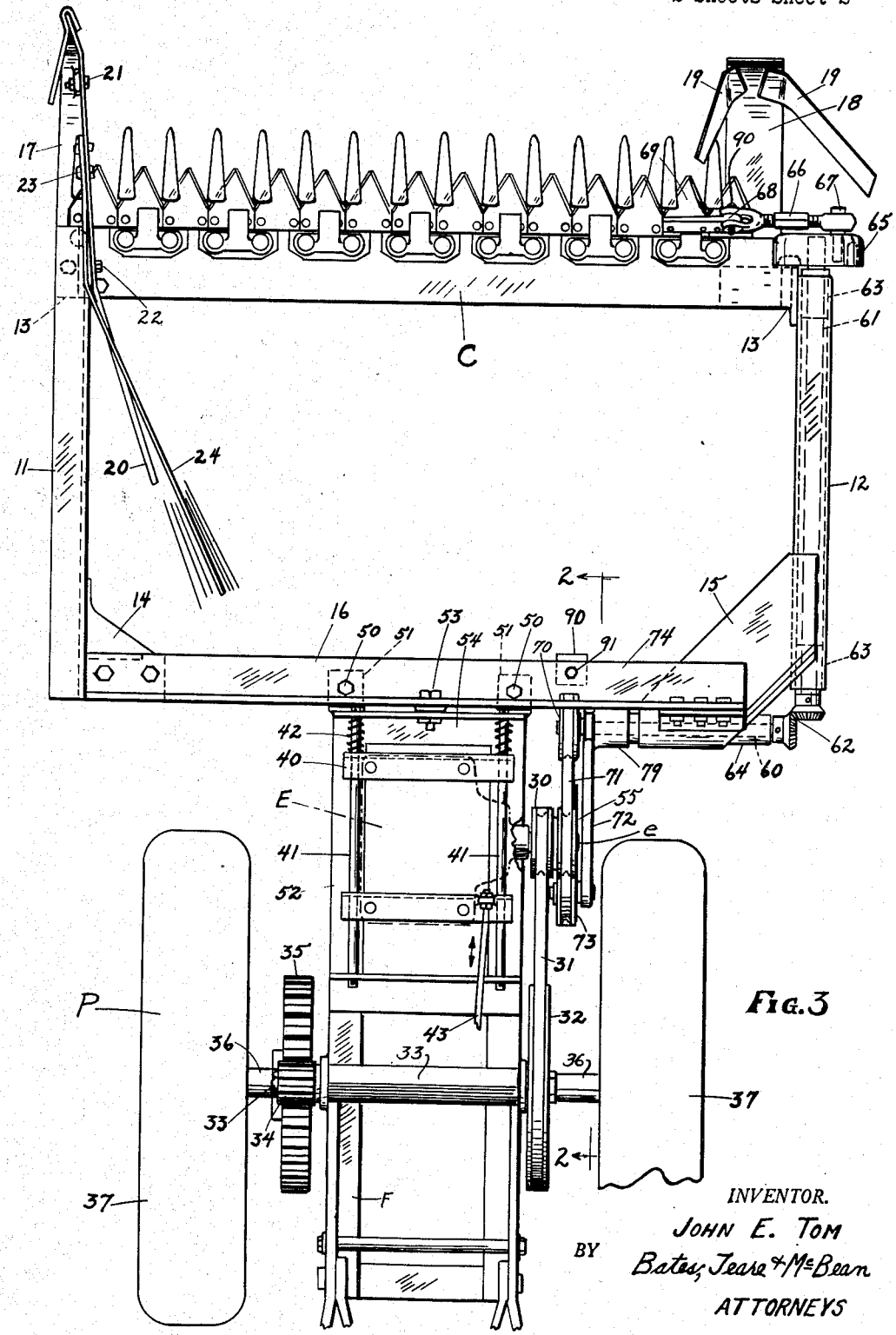

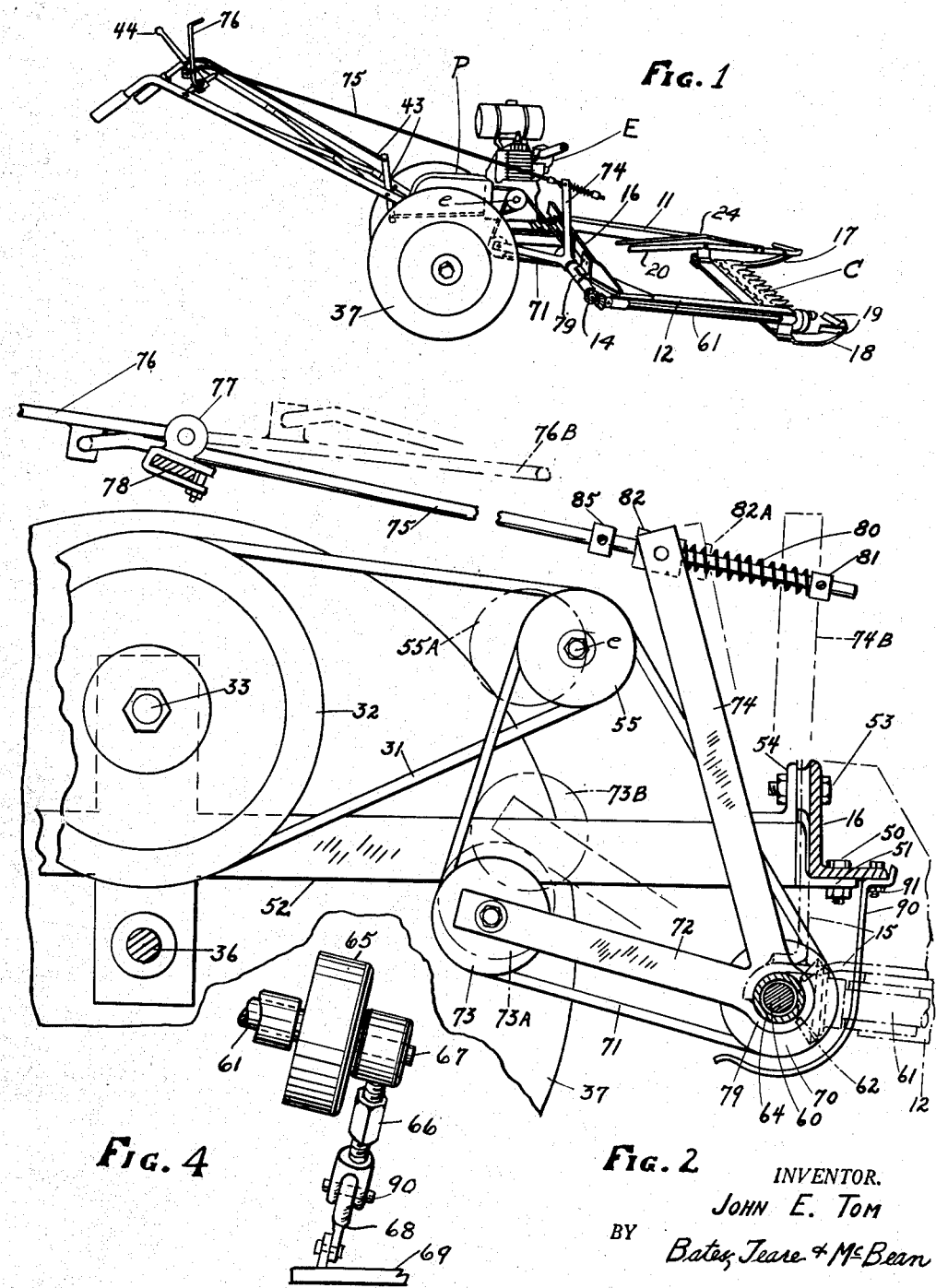

Patented Sept. 19, 1950

2,523,166

UNITED STATES PATENT OFFICE 2,523,166

TRACTOR MOWER CONNECTION

John E. Tom, East Cleveland, Ohio, assignor, by mesne assignments, to Earl Realty Company, Cleveland, Ohio, a corporation of Ohio Application October 4, 1946, Serial No. 701,238

4 Claims. (Cl. 56—26.5)

This invention relates to mower attachments for two-wheeled power actuated tractors. The invention has for its objects the construction of a mower which has few operating parts, which is light in weight, and which has a simple though positive mechanism for operating the cutter bar and which may be readily attached to the forward end of the tractor frame.

In the drawings, Fig. 1 is a perspective view of a two-wheeled power driven tractor showing the mowing attachment embodying the present invention attached thereto; Fig. 2 is a fragmentary section taken on the plane 2—2 of Fig. 3 with the engine pulley shown but the engine omitted for clarity; Fig. 3 is a plan view of the power unit and the mower attachment, and Fig. 4 is an end view showing the connection between the cutter bars and the inclined drive shaft therefor.

In the preferred form shown in the drawings, the mower attachment includes a four-sided open frame, designated generally F and preferably in the form of a rectangle, the forward side of which comprises the usual cutter bar assembly C. The ends of the frame may comprise angle bars 11 and 12 to the forward ends of which brackets 13 are welded or otherwise rigidly secured and are adapted for detachably supporting the cutter bar. The rearward ends of the bars 11 and 12 have combined gussets and brackets 14 and 15 respectively, which are welded or otherwise rigidly attached thereto. An angle bar 16 may be bolted to the members 14 and 15 and may comprise the rear side of the rectangular frame.

To support the forward end of the mower I have shown curved supporting shoes 17 and 18 which are adapted to slide along the ground and to hold the cutter bar at the proper distance above it. Suitable protection against fouling of the cutter bar operating mechanism is provided by wings 19 which are attached to the forward ends of the shoe 18 and which extend rearwardly and outwardly from opposite sides thereof.

To direct the cut material, I have shown a swath plate 20 which is adapted to be attached by a bolt 21 to the shoe 17, and by a bolt 22 to the frame. The swath plate extends rearwardly and inwardly and preferably carries a flexible bar 24 which is bolted thereto at 23, and which extends upwardly and inwardly thereabove. The bar 24 is free to vibrate and operates in an effective manner to lay the cut material over into a proper windrow.

The power unit to which the mower is adapted to be attached is indicated at P as comprising a two-wheeled tractor powered by a gasoline engine. The engine is indicated at E as being mounted upon a carriage 40 that is movable longitudinally of the frame, preferably being slidable upon rods 41 and being normally urged into a rearward belt slackening position by compression springs 42. The engine has a transverse drive shaft $e$ on which is a pulley 30. Power from the engine pulley 30 may be conveyed by a belt 31 to a pulley 32 on a cross shaft 33. A pinion 34 on the cross shaft meshes with a gear 35 on the main axle 36 and thereby operates to drive the wheels 37. A driving connection between the engine and wheels may be obtained by sliding the engine forwardly to tighten the belt 31, and such operation may be effected by the actuation of a shift linkage 43 which has a hand control member 44 conveniently placed adjacent the handles of the tractor.

To connect the mower attachment to the power unit frame 52, I have shown bolts 50 which extend through the bar 16 and through brackets 51 which project forwardly from the tractor frame. An additional connection is made by a bolt 53 which extends through the vertical leg of the bar 16, and through an end member 54 of the tractor frame.

To actuate the cutter bar, the engine E is provided with a double pulley the outer of which is designated 55. Power from the pulley 55 is conveyed to the cutter bar by a transmission system, the various members of which lie substantially entirely within the contour of the frame members, and are thus protected from injury and fouling and from interfering with the proper laying of the swath.

The power for reciprocating the cutter bar is transmitted through a pair of shafts 60 and 61 which are interconnected by miter gears 62. The shaft 61 is carried in suitable bearings which comprise short lengths of tubing 63 that may be welded within the angle bar 12, while the shaft 60 may be carried by similar bearings in an extended tube 64 that is welded to and beneath the gusset plate and the brackets 15. The forward end of the shaft 61 is provided with a crank 65 in the form of a counterbalanced flywheel, while a link 66 adjustable in length interconnects a crank pin 67 and a suitable bracket 68 that is carried by the cutter knives 69. Thus, as the shaft is rotated, the knives are reciprocated in the proper manner.

Rotation of the shafts 60 and 61 may be obtained by means of a pulley 70 which is affixed to the shaft 60 and which is interconnected with the engine pulley 55 by a belt 71. A belt tightener is provided for enabling an operator to engage or disengage the mower drive at will. This device preferably comprises a bell crank (best illustrated at Fig. 2), one arm 72 of which carries an idler pulley 73, while the other arm 74 is linked by a rod 75 to a control lever 76 which in turn is pivoted on a bracket 77. The bracket 77 may be removably mounted upon a cross member 78 of the power unit handle.

The arms of the bell crank are carried by a hub 79 which is rotatably mounted on the shaft carrying tube 64. The belt 71 thus takes a triangular course about the pulleys 55, 60 and 73 and is tensioned by a counterclockwise movement of the bell crank as viewed in Fig. 2. Whenever the control lever 76 is swung to operating position (as illustrated in the full lines of Fig. 2), pressure is placed upon the bell crank by means of a compression spring 80 between a shoulder 81 on the link 75 and a pivoted bearing block 82 on the arm 74. The arrangement is such that the engine may be shifted to a tractor driving position or to idle position without affecting the operation of the mower drive.

Whenever the engine is shifted rearwardly and the engine pulley moves from its full line position 55 to the broken line position 55A, the idler 73 rises only slightly to the position 73A, and the block 82 is moved to the position 82A. For all practical purposes, the force of the spring 80 remains unchanged by this slight movement, and the position of the belt 71 also remains practically unchanged.

The operation of the cutter bar may be stopped by removing the tension from the belt 71 and thus allowing the motor pulley 55 to spin idly. This may be accomplished by swinging the control lever 76 to the idle broken line position 76B (Fig. 2) at which time the link 75 is moved to the right while an abutment 85 on the link engages the block 82 to move the bell crank to the idle position 74B and the idler pulley to the position 73B.

To protect the pulley 70 and belt 71 adjacent the lower portion thereof and to prevent fouling of them by grasses and weeds, I may utilize a guard plate 90 which is attached to the mower frame member 16 as at 91, and which extends downwardly and rearwardly around the pulley as shown particularly in Fig. 2. If desired, a guard plate (not shown) may surround the miter gears 62.

As appears in Figs. 1 and 2, the sides 11 and 12 of the mower frame extend downwardly at an angle of about 15° to the horizontal, whereas the reciprocating cutter bar 19 is disposed in substantially a horizontal plane. Accordingly, to transmit rotary motion from the crank 65 to reciprocatory motion of the cutter bar, I mount the crank pin 67 on an axis parallel to the axis of the shaft 61 and I extend the pivot 90 of the link 66 substantially parallel to the axis of the shaft 61, as is shown in Fig. 4, thereby obviating the necessity for the use of a universal joint between the crank and cutter bar.

Although I have shown the engine E as being shiftable longitudinally of the tractor frame for effecting a driving connection between it and the the tractor wheels, it is understood that I may, if desired, maintain the engine stationary, and utilize a clutch (not shown) for disengaging the power drive between the engine and tractor wheels.

An advantage of the mower attachment embodying the present invention is the lightness, compactness and strength of the mower assembly, as well as the simplicity of the driving connection between the engine and the cutter bar. The method of construction secures alignment of the bearings and thus provides an effective driving connection to the cutter bar notwithstanding unevenness of the terrain over which the tractor may be operated.

I claim:

1. In a two-wheeled tractor having a frame, a motor shiftably mounted thereon having a driving shaft and a belted pulley drive operatively associated with said shaft and the wheels, a second pulley operatively associated with said shaft and rotatable as a unit with said first pulley drive, a mower attached to the frame having a cutter bar thereon, means operatively connected between said cutter bar and said second pulley adapted to reciprocate the cutter bar, said means including a third and fourth pulley spaced from but lying substantially in the same radial plane as the second pulley, a belt extending around the second, third and fourth pulleys, and means on said frame operatively associated with said third pulley adapted to swing it to effect a driving connection between the second pulley and the cutter bar irrespective of the position of the second pulley on said frame.

2. In a two-wheeler tractor having a frame, a motor shiftably mounted thereon having a drive shaft, a first and second pulley drive operatively associated with said shaft, said first pulley-drive operatively connected to the tractor wheels, a mower frame attached to the tractor frame at the forward end thereof, said second pulley-drive including a third pulley journalled on the mower frame, an arm pivotally mounted on the axis of the third pulley carrying a fourth pulley, and a belt extending around the second, third and fourth pulleys, means operatively associated with said arm adapted to shift the arm to control the driving connection between the second and third pulleys, said last mentioned means being operable independently of the position of the motor with respect to the tractor frame, the mower frame having a cutter bar at its forward end, and means operatively associated with said cutter bar and driven by the third pulley for reciprocating the cutter bar.

3. In a power drive for a mower attachment, the combination of a wheeled frame, an engine shiftably mounted thereon, said engine having a belted pulley-drive operatively associated therewith for driving the wheels, a second pulley-drive operatively associated with said engine and driven simultaneously with said first pulley drive, a mower attached to said wheeled frame, said second pulley drive including a driven pulley operatively connected to the mower and an idler pulley associated therewith, a driving belt extending in a direction from the second pulley-drive around the driven and idler pulleys so that tension of the belt on the driven pulley is substantially unchanged by the shifting of the engine carrying said driving pulley.

4. In a power drive for a mower attachment, the combination of a wheeled frame, an engine shiftably mounted thereon having a driving pulley belted to a driven pulley for driving the wheels, a second pulley operatively associated with said engine and said first driving pulley and driven simultaneously therewith, a frame having a mower attached to the tractor frame, a third pulley operatively connected to said mower and an idler pulley associated therewith, a belt extending over said second pulley and around said third pulley and idler pulley, a bell crank pivotally mounted on said frames having one arm carrying the idler pulley and the other arm extending upwardly, and a rod associated therewith coacting with the upwardly extending arm for shifting same.

JOHN E. TOM.

REFERENCES CITED

The following references are of record in the file of this patent:

UNITED STATES PATENTS

| Number | Name | Date |
|---|---|---|
| 1,906,871 | Pearson | May 2, 1933 |
| 2,063,168 | Kinkead | Dec. 8, 1936 |
| 2,070,288 | Mack | Feb. 9, 1937 |
| 2,082,600 | Squires et al. | June 1, 1937 |
| 2,133,512 | Herge | Oct. 18, 1938 |
| 2,196,891 | Berndt | Apr. 4, 1940 |
| 2,280,124 | Kinkead | Apr. 21, 1942 |

FOREIGN PATENTS

| Number | Country | Date |
|---|---|---|
| 113,592 | Great Britain | July 31, 1941 |